United States Patent Office

3,671,229
Patented June 20, 1972

---

3,671,229
PROCESS FOR PURIFICATION OF METALS
Martin Emile Ferber and Michel Georges Wintenberger, Grenoble, France, assignors to Compagnie Pechiney, Paris, France
Filed Dec. 3, 1969, Ser. No. 881,838
Claims priority, application France, Dec. 6, 1968, 176,897
Int. Cl. B22f 1/00
U.S. Cl. 75—211    11 Claims

ABSTRACT OF THE DISCLOSURE

A process for purification of metals such as aluminum by cooling a portion of the metal maintained at a liquid state at slightly above melting point temperature whereby crystals form and collect at the bottom and are sintered by compacting to increase the crystal size and minimize entrainment of impure metal.

---

The present invention relates to a process for the purification of metals, in particular aluminum, by fractional crystalization.

When an alloy solidifies, an element capable of forming a eutectic with the basic metal and present in the alloy in a quantity less than corresponds to the proportion in the eutectic composition concentrates in the liquid phase. This is still true if the element is an impurity and even if it is present only in traces. This property is made use of in the process known as "zone fusion" and in other known processes for the purification of metals.

One of these processes consists in progressively cooling a volume of liquid metal in a heat insulated container so as to promote loss of heat from the free surface of the bath; crystals form at this free surface, fall under gravity and are collected at the bottom of the container by means of a bar of graphite. The operation is carried out in such a manner as to prevent agglomeration of the crystals; in particular, the graphite bar is at a higher temperature than the melting point of aluminum. The operation is stopped before complete solidification has taken place and what remains of the impure liquid is evacuated. The impure interstitial liquid retained by the crystals is thereafter removed by progressively remelting these crystals and at the same time withdrawing from them a fraction of the liquid formed. Only a small proportion of purified metal is obtained and the yield of the operation is low.

Another process consists in renewing the liquid during continuous or semi-continuous casting of a billet. The yield of this process is better than that of the preceding process but the degree of purification is low because the speed of solidification is high and moreover, the crystals which form at the top of the billet inevitably entrain some unpurified liquid in spite of the agitation that is generally provided.

It is an object of this invention to provide a new and improved process for the purification of metals and particularly aluminum in which the process is capable of giving high yield of purified metal in an efficient and economical manner; which does not embody separation of crystals from the mother liquor; which does not employ partial remelting of the crystals; and in which the crystals are formed in the liquid whereby metal oxidation can be minimized.

These and other objects of this invention will hereinafter appear, and for purposes of illustration, but not of limitation, an embodiment of the invention is shown in the accompanying drawing in which—

Figure 1:
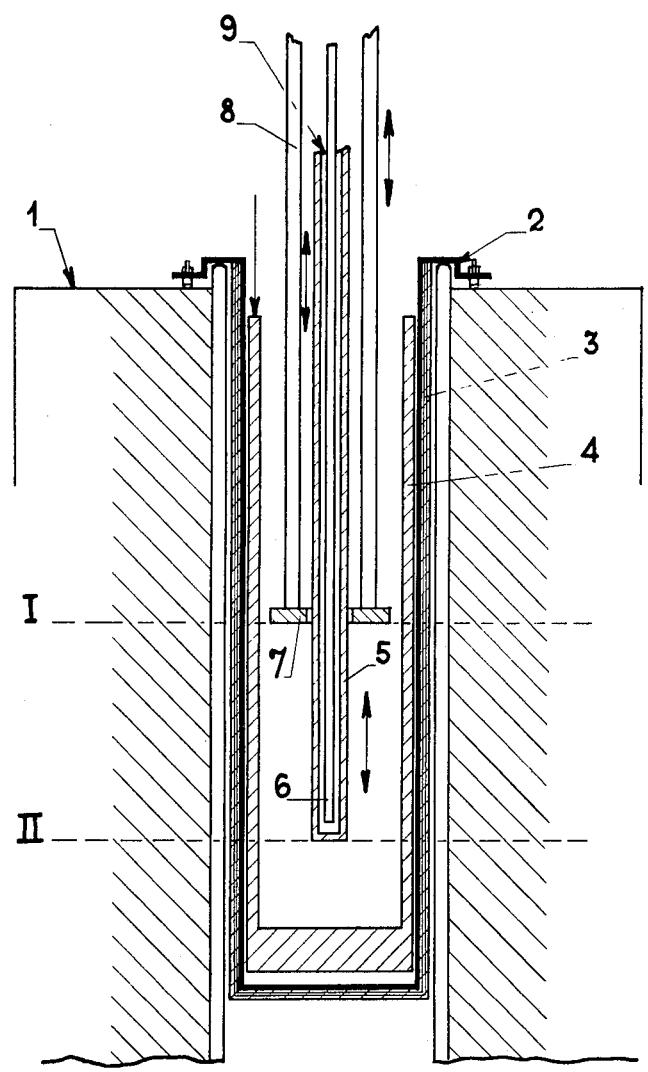
Figure 2:
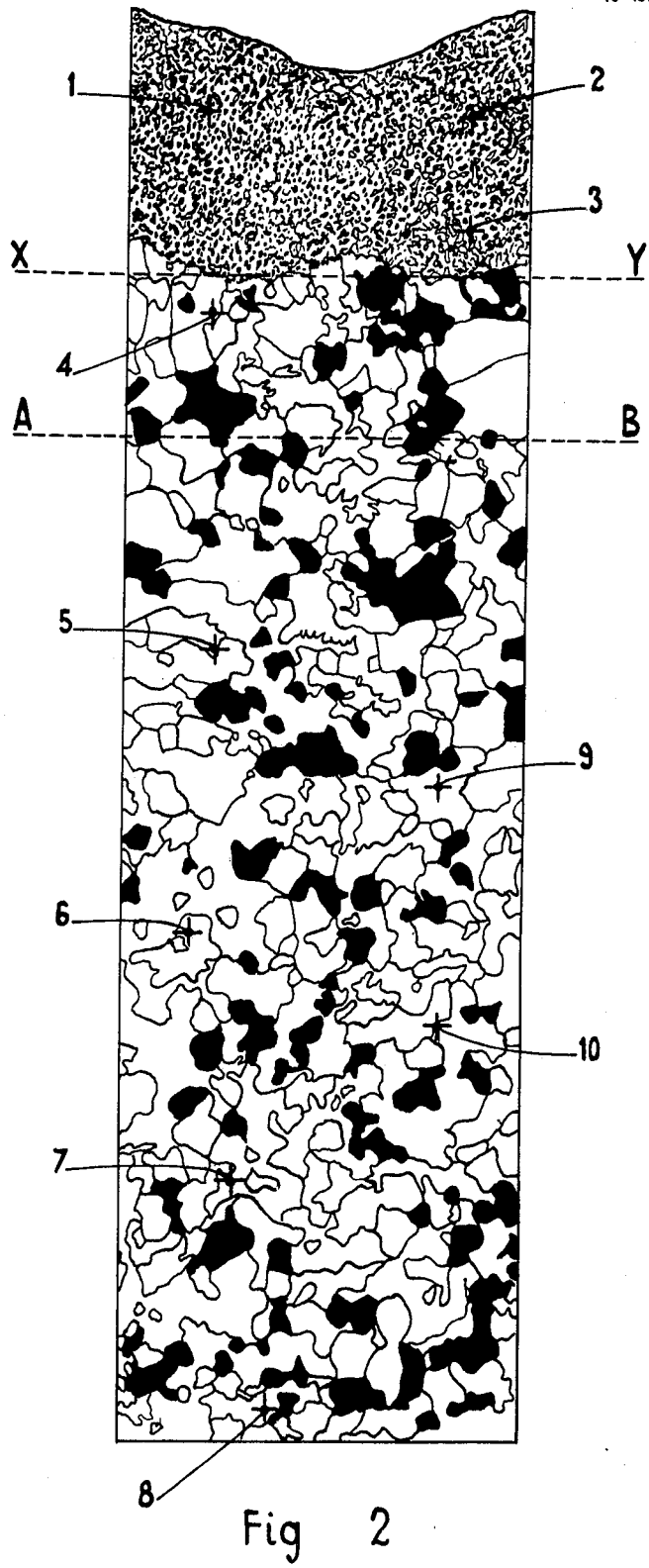

FIG. 1 is a sectional elevational view of a laboratory scale means for metal purification in accordance with the practice of this invention; and FIG. 2 is a longitudinal sectional view through a slug of aluminum obtained by the process of this invention.

When a crystal appears in a liquid metal containing a hypoeutectic impurity, the impurity becomes concentrated in the liquid. The liquid in the immediate vicinity of the crystal is therefore less pure than the original liquid metal. In order to achieve efficient purification, it is desirable to prevent growth of the crystal at the expense of this less pure liquid and moreover, the crystals should be prevented from retaining impure mother liquor.

The object of the present invention is to provide a simple and efficient process in which these two conditions are realized. The process consists in bringing about progressive solidification in a volume of liquid metal by plunging a cooled body into it, the metal being kept near its melting point in an externally heated insulated container. As small crystals form in the vicinity of the cooling body, the process consists in detaching those crystals which agglomerate. As the crystals formed descend under gravity, these crystals are collected from the bottom of the container remote from the zone where they are formed. It also consists in bringing about agglomeration of the small crystals into large crystals. This has the effect of expelling the impure interstitial liquid. Finally, the process consists in separating the purified fraction consisting of the large crystals from the fraction which is enriched in impurities.

FIG. 1 represents a section through one possible embodiment of the purification apparatus of the type which has been used in the laboratory and which enables the mode of operation to be more easily understood. A stainless steel crucible 2, covered with heat insulation 3 and containing a graphite crucible 4, is placed inside a vertical kiln 1. The crucible is almost completely filled with the whole mass of molten metal which is to be purified. Heating of the kiln is regulated in such a manner that the entire unit of crucibles plus liquid metal will initially be raised to a temperature T which is above the melting point of the metal which is to be purified. The plunger unit 5, 6, 7, 8 is then introduced into the liquid metal. The part 5 is a blind graphite tube inside of which is a conduit 6 for compressed gas. This assembly (5 and 6) constitutes the cooling device. The cooling tube 5 is encircled by a graphite ring 7 which is provided with graphite rods 8 which extend out of or above the metal bath and enable the ring 7 to be slid along the tube 5.

At the start of the purification operation, a cold compressed gas is injected into the tube 5, which enables the temperature of the metal to be cooled from the temperature T to the solidification point; the gas, which becomes heated when brought into contact with the tube is evacuated through the annular gap 9 between the gas pipe 6 and the tube 5. At the end of a certain time, crystals form on the walls and the bottom of the tube 5.

The rate of heat loss can be controlled by suitable selection of the heating power of the kiln, the external dimensions of the tube 5 and the rate of flow of cold fluid in the conduit 6 and consequently the rate of solidification of the metal, which determines the total time taken for the operation. A low rate of solidification favors purity of the crystals; the rate of solidification can therefore be influenced and very conveniently regulated by the combination of kiln and plunger.

When the graphite ring 7 is lowered from position I to position II (in broken lines in FIG. 1), the crystals which have formed on the cold walls of the tube 5 are removed by a scraping action. The crystals, which are denser than the liquid from which they have been formed, fall to the bottom of the crucible. The ring 7 also serves periodically to ram the crystals at the bottom of the crucible by an up and down movement. The central part of the mass of crystals is rammed from time to time by the bottom of the tube 5.

The whole sequence of operations described above is repeated as often as is considered necessary. The tube 5 is raised progressively as solidification progresses. The level reached by the crystals can be judged by the length of movement of the ring in the ramming operation. Purification can be stopped by simply withdrawing the plunger from the crucible and stopping the heating by the kiln so that the residual liquid solidifies. In practice, very high degrees of purification can be obtained in fractions amounting to 80% to 90% of the mass of metal. The slower the rate at which solidification is carried out, the more impure is the residual liquid. In practice, purification becomes less efficient when the slowly solidified fraction exceeds 80% of the original mass of metal. The liquid becomes increasingly charged with impurities in the course of solidification and consequently the purity of the solidified crystals progressively diminishes. The average purity of the solid fraction therefore slowly diminishes while that of the liquid fraction diminishes more rapidly.

The process according to the invention has the advantage of being easily stopped at a predetermined volume of purified fraction. Since the speed of solidification can be regulated, not only the purity of the purified fraction but also the purity of the impure fraction can be predetermined to a certain extent. The operation can therefore be carried out in such a way that the impure fraction does not become waste but remains within the standards for certain uses.

FIG. 2 shows the characteristic appearance of a longitudinal section through a 7 kilogram slug of aluminum obtained by the process described above. The dimensions of the particles were found by conventional metallographic procedure. The initial metal content was 99.94% and the process of solidification, which lasted two hours, was stopped when the height of the bed of crystals reached 80% of the total height of the metal in the crucible. The figure shows a surface of separation in the region of the straight line XY, above which the grain is fine and below which the grain is coarser. This line XY corresponds very closely to the level reached by the crystals at the end of the operation just before the plunger was removed and heating was stopped. The coarse crystals situated below XY have diameters which may exceed 1 cm., but, at the moment when they are deposited on the solid mass which has already been deposited, the crystals have a substantially smaller diameter of the order of 1 mm. This can be ascertained by sampling crystals as they detach themselves from the cooler in the course of the operation. Moreover, cells found in the interior of the large grains below XY have dimensions of the order of 1 mm., indicating that these cells are traces left by small crystals which were deposited there.

If the speed of solidification is tool high or if stirring is too vigorous, etc., the presence of large crystals is not observed. The crystals then have diameters of the order of 1 mm., which is close to the diameters that the crystals had at the moment when they were deposited. Under these conditions, the degree of purification is generally much lower (by a factor of about 5) than those obtained when large crystals are formed. The low degree of purification is very probably due to the fact that part of the impure mother liquor has been entrained between the small crystals. It is believed that the large crystals situated below XY result from sintering and recrystallization of small granules of solidification. As these phenomena progress, the mother liquor is progressively returned to the top of the crucible. It is this, at least in part, which gives rise to the high degree of purification found. The process according to the invention does not depend upon substantiation of this hypothesis. However, if the original metal contains a high proportion of grain refiners, formation of large crystals is inhibited, but even then, by establishing suitable thermal conditions, purifications of the order of 8 relating to fractions of 60% to 70% of the metal put into the process can be achieved even in this case.

In FIG. 2, the points marked by reference numerals 1 to 10 correspond to the localization of spectrographic analyses, the results of which are given in Table I. These analyses show that, at the end of operation, the fraction of metal which gives rise to coarse crystallization, amounting to approximately 80% of the initial mass, has been highly purified in that the mean concentration of Fe+Si has been reduced to 1/10.

A simple macrographic procedure, such as pickling, carried out after removal of the slug enables the purified zone to be distinguished from the impure zone. The two zones can then simply be separated as by sawing or any other mechanical means.

Instead of waiting until the impure liquid has solidified at the end of the operation, this liquid may be separated from the purified fraction by syphoning or by pouring it off as by tipping the crucible.

TABLE I

| Reference | Results of analysis in p.p.m. | | | |
|---|---|---|---|---|
| | Fe | Si | Zn | Ga |
| Starting metal analysis on sample of casting | 270 | 320 | 50 | 55 |
| Pinpoint analyses, part enriched in impurities: | | | | |
| No. 1 | 1,600 | 2,400 | 130 | 200 |
| No. 2 | 1,600 | 1,200 | 140 | 200 |
| Interface: | | | | |
| No. 3 | 550 | 800 | 80 | 120 |
| No. 4 | 50 | 90 | 60 | 50 |
| Purified part: | | | | |
| No. 5 | 15 | 30 | 30 | 10 |
| No. 6 | 10 | 15 | 10 | 10 |
| No. 7 | 10 | 15 | 20 | 10 |
| No. 8 | 10 | 10 | 25 | 10 |
| No. 9 | 10 | 20 | 15 | 10 |
| No. 10 | 10 | 10 | 25 | 10 |
| Analysis of samples obtained by remelting a fraction of the purified zone representing 72% of the original mass (5 kg.) (part below line A-B in FIG. 2): | | | | |
| Analysis (p.p.m.) | 15 | 20 | 25 | 30 |
| Degree of purification Fe plus Si | (1) | (1) | (1) | (1) |
| Mean composition of the purified zone, i.e. 80% of the original mass (5.5 kg.) (part below line X-Y, FIG. 2): | | | | |
| Analysis (p.p.m.) | 21 | 38 | 29 | 37 |
| Degree of purification Fe plus Si | (2) | (2) | (2) | (2) |

[1] 17 times.
[2] 10 times.

The tables below show other typical results obtained with different qualities of aluminum.

Examples 1–2 and 3 (Tables II–III and IV) show that very high degrees of purification, even greater than 20, can be obtained in fractions representing 50% to 60% of the initial batch.

TABLE II

Example 1:
Weight put into the process, kg ........................... 4
Time of operation, hours ................................. 3
Fraction remelted after removal from the purified zone, percent (2 kg.) ............................................. 50

| | Fe | Si | Cu |
|---|---|---|---|
| Analysis (p.p.m.) of analysis samples: | | | |
| Original metal | 550 | 620 | 40 |
| Remelted fraction | 10 | 40 | 10 |
| Overall degree of purification Fe plus Si | (1) | (1) | (1) |

[1] 20 times.

The process can also be used for other qualities of aluminum, for example those in which the concentration ranges from 99.5 to 99.9, and in this case it enables a high percentage of metal amounting to 99.95 and 99.995 purity to be obtained. This is essential for certain heat resistant alloys or in cases where a high reflective power for light is required.

The process is also applicable to very pure aluminum and it then results in very efficient purification, as shown in Table IV (Example 3).

TABLE III

Example 2:
- Weight put into the process, kg: 4.4
- Time of operation, hours: 3
- Fraction remelted after removal from the purified zone, percent (2.75 kg.): 62.5

|  | Fe | Si | Zn | Ga |
|---|---|---|---|---|
| Analysis (p.p.m.) of analysis samples: | | | | |
| Starting metal | 270 | 320 | 50 | 55 |
| Remelted fraction | 8 | 22 | 10 | 6 |
| Overall degree of purification Fe plus Si | (1) | (1) | (1) | (1) |

[1] 19 times.

TABLE IV

Example 3:
- Weight put into the process, kg: 6.2
- Time of operation, hours/minutes: 2/50
- Fraction remelted after removal from the purified zone, percent (3.1 kg.): 50

|  | Fe | Si | Cu |
|---|---|---|---|
| Analysis (p.p.m.) on analysis samples: | | | |
| Starting metal | 23 | 5 | 2 |
| Remelted fraction | 5.3 | 4.3 | <1 |
| Overall degree of purification Fe plus Si plus Cu | >2.8 | >2.8 | >2.8 |

The process is also applicable to a metal which has only partially been freed from its impurities. In the case of aluminum, it is particularly convenient to remove the peritectic impurities Ti, V ... by a treatment with boron and then to remove the eutectic impurities by the process of this invention.

The same process of solidification has been applied to metals and alloys other than aluminum. Thus refined lead or zinc containing about 1000 p.p.m. of aluminum have been solidified by the technique described above. In these examples, the formation of large crystals resulting from agglomeration of small crystals of solidification was again observed.

In the case of zinc containing about 1000 p.p.m. of aluminum (Example 5), the analytical results were as follows:

Analysis carried out with microanalyzer with electronic fathometer

| | Al (p.p.m.) |
|---|---|
| Lower part of slug=large crystals | 100 to 200 |
| Upper part of slug=small crystals | 1800 to 2700 |

Instead of graphite, the crucible 4 and the plunger unit 5, 6, 7, 8 may be formed of carbon, agglomerated graphite powder, electrofused magnesium or aluminum nitride. In the practice of the invention, it is desirable externally to heat the crucible 2 at a temperature 50–100° C. above the metal temperature and to cool the internal surface of the plunger 5 to a temperature of about 100–150° C. below metal temperature, with the metal temperature at about its melting point or slightly above.

It will be understood that changes may be made in the construction and operation without departing from the spirit of the invention, especially as defined in the following claims.

We claim:

1. In a process for the purification of metal containing eutectic impurities in which the metal is selected from the group consisting of aluminum, zinc and lead comprising the steps of introducing heat sufficient to maintain a volume of the metal at a temperature slightly above its melting point, immersing a body into the volume of the metal, circulating a coolant through the body to cool the body to a temperature slightly below the melting point temperature of the metal and for removal of heat of solidification from the metal adjacent the body whereby crystals of pure metal form below the surface of the volume of metal adjacent to the body, some of which collect on the outer surfaces of the cooled body in contact with the molten metal, periodically positively displacing crystals of metal from the surfaces of the cooled body to free the crystals from the body, allowing the crystals which form adjacent the body and which are displaced from the body to fall gravitationally downwardly through the molten metal to a deposition zone, and tamping the mass of crystals collected in the deposition zone to displace interstitial liquid metal and to effect an increase in the size of the collected crystals.

2. The process as claimed in claim 1 in which the metal to be purified is aluminum.

3. The process as claimed in claim 1 in which the body is a graphite plunger and in which the body is cooled by circulating a fluid through the interior of the plunger for cooling.

4. The process as claimed in claim 3 in which the fluid is air.

5. The process as claimed in claim 4 which includes the step of controlling the rate of solidification of the metal by controlling the rate of flow of cooling fluid, the amount of heat introduced into the liquid volume to maintain the liquid state or the thermal insulation about the liquid volume.

6. The process as claimed in claim 1 which includes the steps of separating the crystals deposited on the surface of the cool body.

7. The process as claimed in claim 1 in which the separation is effected by allowing the entire volume to solidify and then separating the purified crystalline portion from the remainder while in a solidified state.

8. The process as claimed in claim 1 in which separation is effected while the impure metal is in a liquefied state by removal of the upper liquid layer containing the impure fraction from the lower layer containing the purified crystalline fraction.

9. The process as claimed in claim 8 in which the liquid fraction of impure metal is removed by syphoning.

10. The process as claimed in claim 8 in which the liquid fraction of impure metal is removed by pouring.

11. The process as claimed in claim 1 in which the metal has previously been partially purified.

References Cited

UNITED STATES PATENTS

| 3,211,547 | 10/1965 | Jarrett et al. | 23—305 |
| 3,303,019 | 2/1967 | Jacobs | 75—65 R |
| 3,239,899 | 3/1966 | Johnson | 75—63 |
| 3,376,131 | 4/1968 | Schmidt | 75—63 |
| 3,543,531 | 12/1970 | Adams | 75—68 |
| 2,198,673 | 4/1940 | Loevenstein | 75—63 |
| 3,373,014 | 3/1968 | Merles | 75—63 |
| 3,198,625 | 8/1965 | Stroup | 75—68 |
| 3,249,425 | 5/1966 | Aamot | 75—63 |

CARL D. QUARFORTH, Primary Examiner

B. H. HUNT, Assistant Examiner

U.S. Cl. X.R.

75—63, 68 R